US011388868B2

(12) United States Patent
LaRue (10) Patent No.: US 11,388,868 B2
(45) Date of Patent: Jul. 19, 2022

(54) IRRIGATION SYSTEM FOR APPLYING APPLICANT HAVING A MICROBE CONCENTRATION TO ENHANCE CROP PRODUCTION

(71) Applicant: Valmont Industries, Inc., Omaha, NE (US)

(72) Inventor: Jacob L. LaRue, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 784 days.

(21) Appl. No.: 16/366,352

(22) Filed: Mar. 27, 2019

(65) Prior Publication Data

US 2019/0297799 A1 Oct. 3, 2019

Related U.S. Application Data

(60) Provisional application No. 62/649,619, filed on Mar. 29, 2018.

(51) Int. Cl.
| | |
|---|---|
| *A01G 25/16* | (2006.01) |
| *A01G 25/09* | (2006.01) |
| *C05G 3/70* | (2020.01) |
| *C05F 11/08* | (2006.01) |
| *A01G 25/02* | (2006.01) |

(52) U.S. Cl.
CPC ......... *A01G 25/167* (2013.01); *A01G 25/092* (2013.01); *C05F 11/08* (2013.01); *C05G 3/70* (2020.02); *A01G 25/02* (2013.01)

(58) Field of Classification Search
CPC .... A01G 25/092; A01G 25/09; A01G 25/167; A01G 25/16; A01C 23/042; A01C 23/04; A01C 23/00; C05F 11/08; C05G 3/70; C05G 3/50
See application file for complete search history.

(56) References Cited

U.S. PATENT DOCUMENTS

| | | | |
|---|---|---|---|
| 3,210,917 A | 10/1965 | John et al. | |
| 3,381,893 A | 5/1968 | Smith et al. | |
| 3,446,434 A | 5/1969 | Smith, Jr. et al. | |
| 4,121,767 A | 10/1978 | Jensen | |
| 4,209,131 A * | 6/1980 | Barash | G05D 22/02 239/69 |

(Continued)

FOREIGN PATENT DOCUMENTS

| | | |
|---|---|---|
| CN | 203378366 | 1/2014 |
| WO | 1999016296 A1 | 4/1999 |

*Primary Examiner* — David Colon-Morales
(74) *Attorney, Agent, or Firm* — Milligan PC LLO (57) ABSTRACT

The present invention provides an irrigation system that includes a control system for determining whether to apply an applicant to an agricultural field. In an implementation, the control system includes memory operable to store one or more modules and a processor coupled to the memory. The processor is operable to execute the one or more modules to cause the processor to receive one or more signals representing a microbe characteristic from a soil sensor. The processor is also operable to determine whether to apply an applicant (i.e., water having a concentration of a biological or a microbe therein) to a soil based upon the microbe characteristics and to initiate operation of the irrigation assembly to apply the applicant to the soil in response when the soil requires the applicant.

20 Claims, 4 Drawing Sheets

(56) References Cited

U.S. PATENT DOCUMENTS

| | | | |
|---|---|---|---|
| 4,354,636 A | 10/1982 | Halt | |
| 4,405,085 A | 9/1983 | Meyer | |
| 4,763,836 A * | 8/1988 | Lyle | A01G 25/09 239/69 |
| 4,828,177 A | 5/1989 | Schuitemaker | |
| 4,892,256 A | 1/1990 | Brown et al. | |
| 5,227,068 A * | 7/1993 | Runyon | B01F 23/234 239/10 |
| 5,246,164 A * | 9/1993 | McCann | A01G 25/16 239/11 |
| 5,709,343 A | 1/1998 | Myers | |
| 5,779,163 A | 7/1998 | Gunter | |
| 5,913,915 A * | 6/1999 | McQuinn | A01C 23/007 701/50 |
| 5,927,603 A * | 7/1999 | McNabb | A01G 25/167 239/69 |
| 5,937,489 A | 8/1999 | Gunter | |
| 6,236,907 B1 * | 5/2001 | Hauwiller | A01B 79/005 701/50 |
| 6,293,475 B1 | 9/2001 | Sobolik | |
| 7,051,952 B2 | 5/2006 | Drechsel | |
| 7,899,580 B2 * | 3/2011 | Cardinal | A01G 25/167 700/86 |
| 8,035,403 B1 | 10/2011 | Campbell et al. | |
| 8,353,470 B2 | 1/2013 | Sinden et al. | |
| 8,942,893 B2 | 1/2015 | Rosa et al. | |
| 9,363,956 B1 | 6/2016 | Standley | |
| 9,886,016 B2 * | 2/2018 | Bermudez Rodriguez | G05B 15/02 |
| 9,943,046 B2 * | 4/2018 | Bermudez Rodriguez | A01G 25/092 |
| 10,244,675 B2 * | 4/2019 | LaRowe | A01C 23/006 |
| 10,296,005 B2 * | 5/2019 | Cantrell | B64C 39/024 |
| 2001/0035468 A1 | 11/2001 | Cruz et al. | |
| 2002/0183935 A1 * | 12/2002 | Skinner | A01G 22/05 239/93 |
| 2005/0245398 A1 * | 11/2005 | Stock | A01N 63/20 504/117 |
| 2007/0220808 A1 * | 9/2007 | Kaprielian | A01G 27/003 47/48.5 |
| 2008/0046130 A1 * | 2/2008 | Faivre | A01G 25/092 239/728 |
| 2012/0048972 A1 | 3/2012 | Neto | |
| 2013/0223934 A1 | 8/2013 | Veitsman et al. | |
| 2014/0024313 A1 * | 1/2014 | Campbell | H04B 1/3822 455/41.2 |
| 2017/0305804 A1 * | 10/2017 | Ayers | C05G 5/20 |
| 2018/0007847 A1 * | 1/2018 | Raj | B64C 39/024 |

\* cited by examiner

IRRIGATION SYSTEM FOR APPLYING APPLICANT HAVING A MICROBE CONCENTRATION TO ENHANCE CROP PRODUCTION

RELATED APPLICATIONS

The present application claims priority to U.S. Provisional Application No. 62/649,619 filed Mar. 29, 2018.

BACKGROUND AND FIELD OF THE PRESENT INVENTION

Field of the Present Invention

The present invention relates generally to irrigation machines and, more particularly, to a system, method and apparatus for applying an applicant having a microbe concentration to enhance crop production.

BACKGROUND OF THE INVENTION

Modern day agriculture has become increasingly efficient in the past century and this trend must continue in order to produce enough food for the increasing world population. A notable advancement in agricultural production was the introduction of mechanized irrigation systems, such as the center pivot and the linear move irrigation systems. These irrigation systems make it possible to irrigate entire fields and reduce a crop yield's vulnerability to extreme weather conditions. The ability to monitor and to control the amount of water and/or nutrients (applicants) applied to an agricultural field has increased the number of farmable acres in the world and increases the likelihood of a profitable crop yield. These irrigation systems typically include a control device configured to furnish a user interface allowing the operator to monitor and control one or more functions or operations of the irrigation system.

In order to overcome the limitations of the prior art, a system is needed which is able to efficiently and controllably increase the amount of nutrients applied to an agricultural field.

SUMMARY OF THE DISCLOSURE

To minimize the limitations found in the prior art, and to minimize other limitations that will be apparent upon the reading of the specifications, an irrigation system is disclosed that includes a control system for determining whether to apply an applicant to an agricultural field. In an implementation, the control system includes memory operable to store one or more modules and a processor coupled to the memory. The processor is operable to execute the one or more modules to cause the processor to receive one or more signals representing a microbe characteristic from a soil sensor. The processor is also operable to determine whether to apply an applicant (i.e., water having a concentration of a biological or a microbe therein) to a soil based upon the microbe characteristics and to initiate operation of the irrigation assembly to apply the applicant to the soil in response when the soil requires the applicant.

BRIEF DESCRIPTION OF THE DRAWINGS

The detailed description is described with reference to the accompanying figures. The use of the same reference numbers in different instances in the description and the figures may indicate similar or identical items. The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Different amounts and types of fertilizer, herbicide, fungicide and other crop production products are applied in an attempt to improve the field productivity. Additionally, microorganisms, or microbes, may be utilized to improve a root environment for vegetation within a cultivation area, such as a field.

Figure 1A:
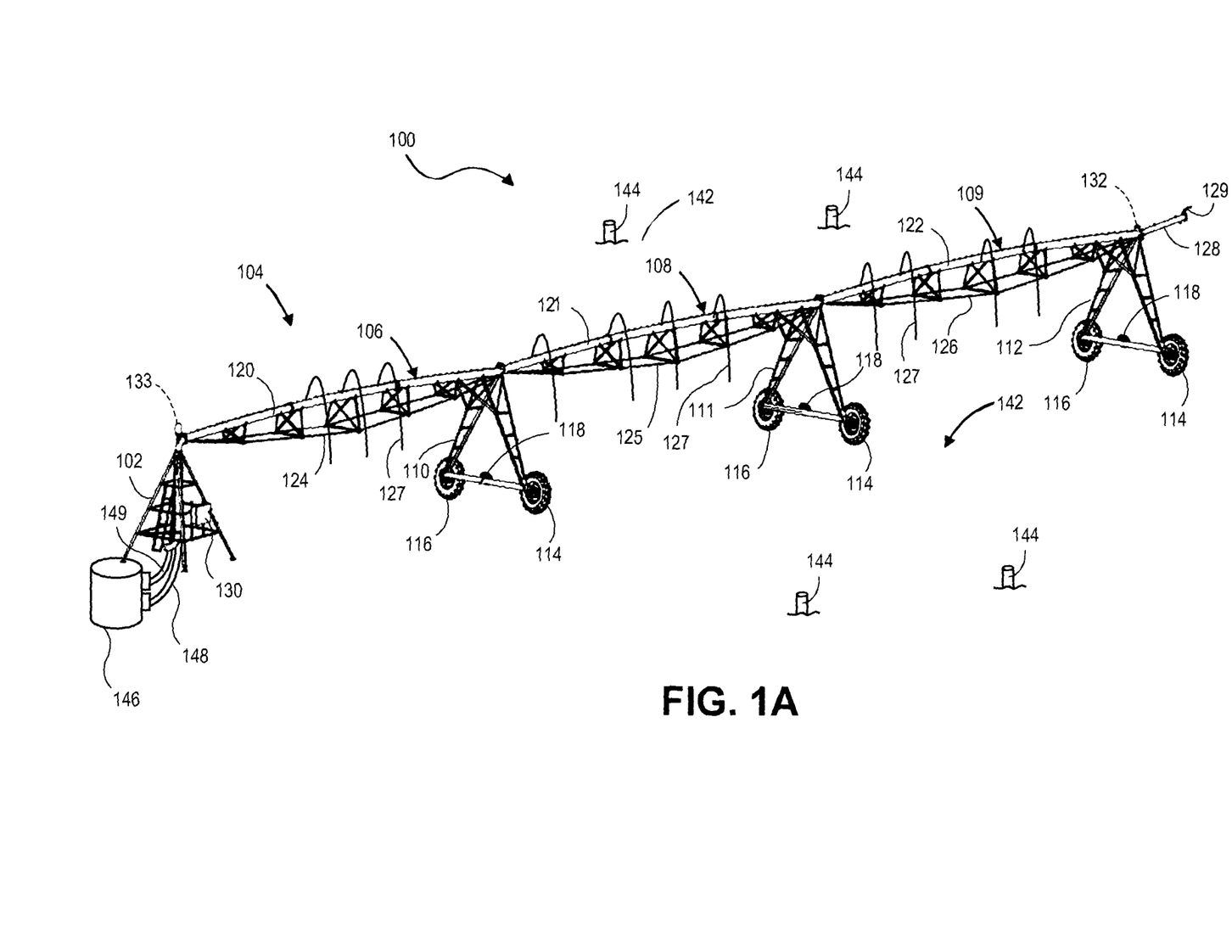
FIG. 1A is an isometric diagrammatic perspective view of an irrigation system in accordance with an example implementation of the present disclosure.

FIG. 1A illustrates a self-propelled (e.g., mechanized) irrigation system (assembly) 100 in accordance with example implementations of the present disclosure. Examples of self-propelled irrigation systems include a center pivot irrigation system, a linear move irrigation system, or the like. FIG. 1A illustrates an embodiment of the present disclosure where the irrigation system 100 is a center pivot irrigation system.

However, it is contemplated that the present disclosure may be implemented in other self-propelled irrigation systems (e.g., linear move irrigation systems). As shown, the system 100 includes a center pivot structure 102, a main section assembly 104 (irrigation section assembly) coupled (e.g., connected) to the center pivot structure 102. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be a combination of water and microbes for irrigating a cultivation area. The irrigation system 100 may be coupled to a fluid displacement device (e.g., a pump assembly) configured to furnish water throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111 and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable drive unit 118 (e.g., drive motor), or the like, to assist in traversing the system 100 about the specified area. For example, each tower structure 110 may include a drive unit 118 to propel the respective tower structure 110, 111, 112 (and the irrigation system 100) through the cultivation area.

As shown in FIG. 1A, each span 106, 108 includes conduits 120, 121, 122 (e.g., pipes) that carry (e.g., transport, provide, and so forth) liquid (e.g., applicant) along the length of the system 100 to one or more applicant dispersal assemblies that irrigate the cultivation area. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may displace applicants through the conduits 120, 121, 122, which is then dispersed by the dispersal devices 127, which are coupled to the conduits 120, 121, 122. As shown in FIG. 1A, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer which can be activated at the corners of a field, or other designated areas, to increase the amount of land that can be irrigated.

Figure 1B:
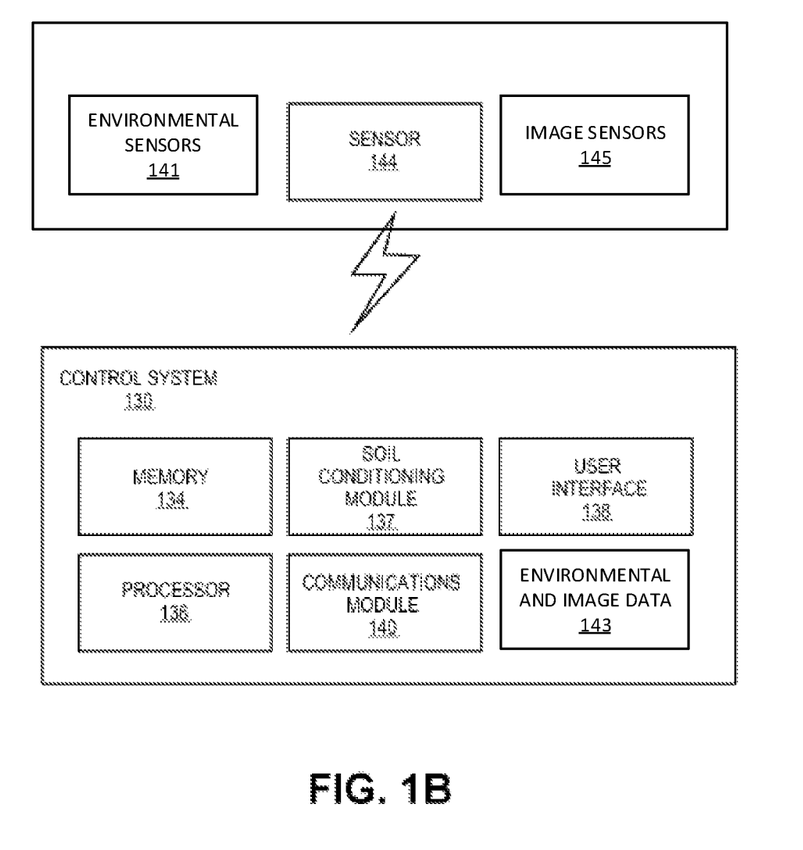
FIG. 1B is a block diagram illustrating a control system of the irrigation system shown in FIG. 1A in accordance with an example implementation of the present disclosure.

As shown in FIGS. 1A and 1B, the irrigation system 100 includes a control system 130 that is in electronic communication with one or more components of the system 100. For example, the control system 130 may be in electronic communication with one or more tower boxes mounted at one or more tower structures 110, 111, 112, and a position sensor 132 utilized to determine an approximate position of the irrigation system (e.g., determining the approximate position of the end tower structure 112 within the cultivation area with respect to the center pivot structure 102). In an implementation, the position sensor 132 may be a GPS sensor (e.g., GPS receiver), or the like, mounted to the end tower structure 112 which can transmit signals representing the position of the end tower structure to the control system 130. As described herein, the control system 130 may preferably determine the radial position of the main section assembly 104 with respect to the center pivot structure 102. In another implementation, the position sensor may be an angle sensor 133 which can facilitate determination of the rotational position of the main section assembly 104. The angle sensor 133 may be mounted to the center pivot structure 102 to assist in determining the rotational position of the main section assembly 104.

In an implementation, the control system 130 is mounted to the central pivot structure 102, a control cart, or a tower structure 110, 111, 112. The control system 130 is generally located on the structural element of the irrigation system 100 where the applicant/water is introduced into the irrigation system; however, other configurations known in the art are within the scope of the present disclosure.

The control system 130 may preferably monitor operating conditions and may control various functions of the irrigation system 100. In certain implementations, the control system 130 actively monitors the irrigation system's 100 function and performance including, but not limited to: a position of one or more conduit sections 120, 121, 122 or tower structures 110, 111, 112 (e.g., the position of the main section assembly 104), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the fluid displacement device is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly.

The control system 130 also controls the irrigation system 100's functions and settings including, but not limited to: start and stop, selectively powering the main fluid displacement device, an applicant application depth parameter, the direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control system 130 may cause an alert to be issued to the operator if there are any errors in the operation of the irrigation system 100 or if any of the functions or conditions monitored by the control system 130 have been compromised (e.g., ceased operation or are outside an acceptable range).

With reference now to FIG. 1B, the control system 130 may be accessed through an interface 138 housed within a weather-proof box or may be remotely linked. As shown in FIG. 1B, the control system 130 includes at least a memory 134 to store one or more software programs (e.g., software modules), a processor 136 communicatively coupled to the memory 134, a user interface 138 (e.g., graphical user interface, etc.), and a communications module 140 (e.g., transmitter, receiver, transceiver, etc.). The memory 134 is an example of tangible computer-readable media that provides storage functionality to store various data associated with the operation of the control system 130, such as software programs/modules and code segments mentioned herein, or other data to instruct the processor 136 to perform the steps described herein. As shown, the control system 130 includes a soil conditioning module 137, which is storable in the memory 134 and executable by the processor 136. The soil conditioning module 137 is representative of functionality to cause the dispersal of an applicant, such as water, combined with microbes from the irrigation system 100, as described in greater detail below. The user interface 138 may preferably receive one or more user-defined parameters (user-defined inputs) for operating the irrigation system 100. Further, the control system 130 may include a module 143 for receiving and processing environmental data (e.g. weather) and image data. Preferably, the environmental and image data may be received from environmental sensors 141 and image sensors 145 which may be integrated with the irrigation system or remote linked.

According to alternative embodiments, the environmental sensors 141 may include weather sensors or the like to measure weather features such as humidity, pressure, precipitation, solar radiation, temperature and the like. Further, image sensors 145 may include a range of sensing elements including spectrometers, infrared sensors and optical sensors/cameras to detect crop health, crop water use, crop water stress index, plant production ratio and provide data to calculate other crop indices. According to a still further for environment, the image sensors 145 may detect and/or obtain data to produce NDVI, EVI and a variety of other indices. Further, such data may be produced via an airborne sensor or satellite and transmitted to the control system.

As shown in FIG. 1A, the irrigation system 100 may preferably be within an agricultural field 142 and function to disperse an applicant to the field 142. The field 142 may include one or more sensors 144 deployed within the field 142 and/or mounted on the irrigation system 100. The sensors 144 may preferably communicatively interface with the control system 130. For example, the sensors 144 may be communicatively connected to the control system 130 via one or more in-ground wires. In another example, the sensors 144 may be communicatively connected to the control system 130 via a wireless communication network (i.e., communicatively connected with the communications module 140). In this example, the sensors 144 may preferably transmit one or more wireless signals to the control system 130, as described in greater detail herein.

In one or more implementations, the sensors 144 include moisture sensors to measure a moisture content of the field 142. The sensors 144 may preferably determine (i.e., measure) the amount of moisture within a portion of the soil of the field 142 for which the respective sensor 144 is positioned. For instance, the sensors 144 may preferably measure a volumetric soil moisture and provide one or more signals representing the same. The sensors 144 may also measure a microbe content within the soil. For example, the sensors 144 may preferably measure a level, or concentration, of microbes within the soil of the field 142. And the sensors 144 may monitor crop health using RGB and/or spectrophometric images.

The irrigation system 100 further includes a repository 146 that is in fluid communication with the conduits 120, 121, 122 (i.e., the main section assembly 104). In one or more implementations, the repository 146 includes a storage tank which may store microbes and/or other biologics. For example, the repository 146 may be a storage tank that is positioned proximate to the center pivot structure 102 and is connected to a conduit (i.e., a water supply pipe) of the irrigation system 100 via a bypass conduit arrangement. For example, the repository 146 may be in fluid communication with the irrigation system 100 via an inlet conduit 148 and an outlet conduit 149. In one or more implementations, the repository 146 may include packages that include microbes and/or other biologics. For example, the microbes may be included within packages shaped like tablets, as a powder in suspension or a liquid. However, it is understood that other package shapes may be utilized in accordance the requirements of the present disclosure.

Figure 2:
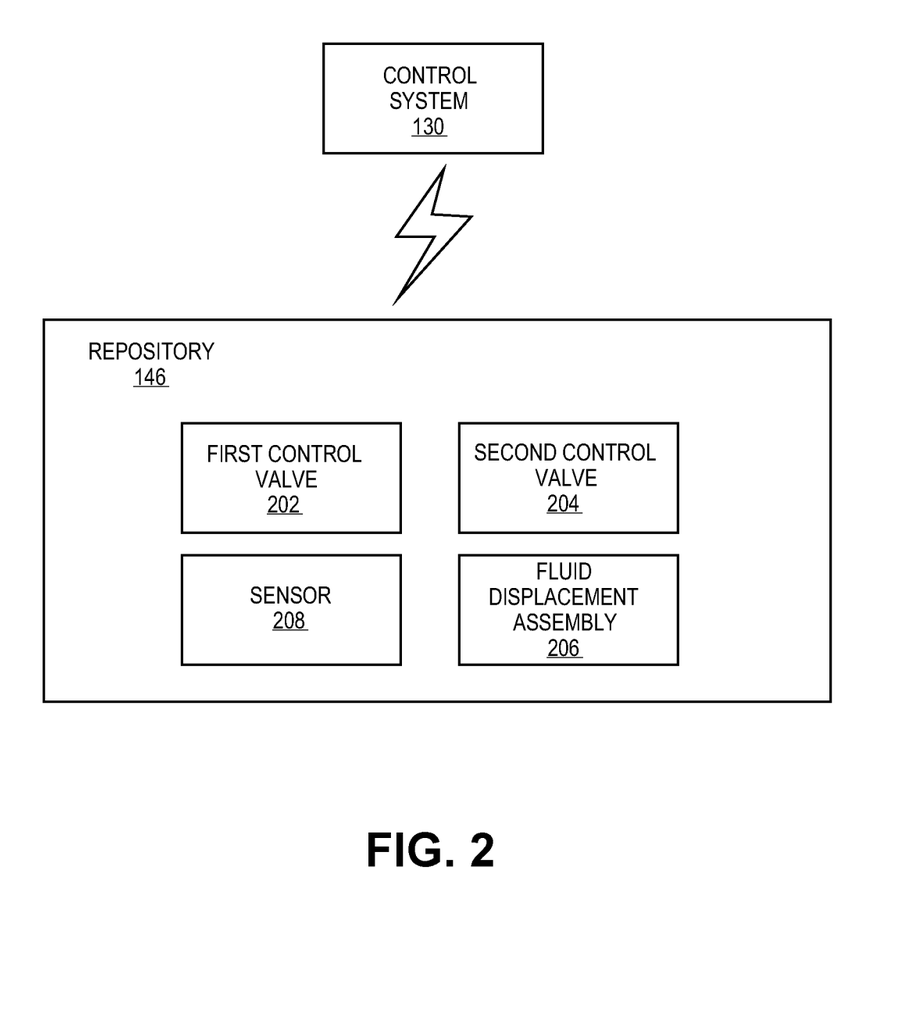
FIG. 2 is a block diagram illustrating a control system operatively coupled to a repository of the irrigation system in accordance with an example implementation of the present disclosure.

Depending on how the microbes/biologics are packaged may be directly injected using a pump designed for the application. Or as shown in FIG. 2, the repository 146 may include a set of control valves 202 and 204. The control valves 202, 204 may preferably control a water characteristic to and from the repository 146. For example, the first control valve 202 controls an inlet water characteristic of the inlet conduit, and the second control valve 204 controls an outlet water characteristic of the outlet conduit. The water characteristics may include, but are not limited to: flow, pressure, or liquid level.

The control system 130 is operatively coupled to the repository 146. For instance, the control system 130 may control the control valves 202, 204. In an implementation, the control system 130 controls a water flow via the inlet conduit 148 to at least partially erode the microbe packages. For example, the microbe packages may be eroded via a shearing process, or the like. Thus, the control system 130 may vary (e.g., alter, modify) a water characteristic (i.e., flow, pressure, liquid level) to regulate a concentration of microbes that are furnished to the irrigation system 100 for dispersal. For instance, water may be provided to the repository 146 from the water source via the inlet conduit 148 and a water/microbe concentration may be furnished to the conduits of the irrigation system 100 via the outlet conduit 149.

As shown in FIG. 2, the repository 146 may include a fluid displacement assembly 206 (e.g., a pump assembly) may displace the water and the microbes to ensure flow of the microbes from the repository 146 into the conduits 120, 121, 122. In one or more implementations, the control system 130 is operatively coupled to the assembly 206.

According to a further preferred embodiment, the repository 146 may also include a microbe sensor 208 which may monitor a level of microbes within the repository 146. For example, the sensor 208 may include a weight sensor which may determine a weight parameter of the repository 146. Thus, the sensor 208 may measure a weight over a predetermined period of time. Based upon a detected change in weight (e.g., microbe packages are being eroded), the sensor 208 may provide a signal to the control system 130, which in response, may notify an operator (e.g., sends a signal to a remote device of the operator). Alternatively, the sensor may detect microbe concentrations using timers, chemical sensors, light sensors or the like. The sensor 208 may also preferably monitor a flow of water through the vessel in addition to the concentration of the microbes within the water. For example, the module 137 preferably may determine whether a given soil microbe characteristic is below a predefined threshold and adjust microbe concentrations accordingly.

During operation, the control system 130 of the irrigation system 100 may preferably continually monitor soil characteristic parameters (i.e., a moisture parameter, a microbe parameter) and/or plant health. For example, the sensors 144 may preferably at least instantaneously measure the moisture level, a microbe/biologic level and/or crop health in field 142. If the parameters are below predetermined thresholds, the module 137 may preferably modify a microbe concentration within the repository 146. For instance, if a measured microbe concentration parameter is below a predefined threshold, the module 137 may trigger a signal to the control valve 202 and/or the control valve 204. In response, the water characteristics and/or the microbe concentrations levels within the irrigation system 100 may be modified. For example, if a measured microbe concentration parameter is outside of a predefined threshold or target range, the module 137 may operate to maintain, decrease or increase the microbe concentration within the irrigation system 100. Further, microbe concentration levels may be further adjusted based on inputted watering schedules and/or variable rate prescriptions.

Figure 3:
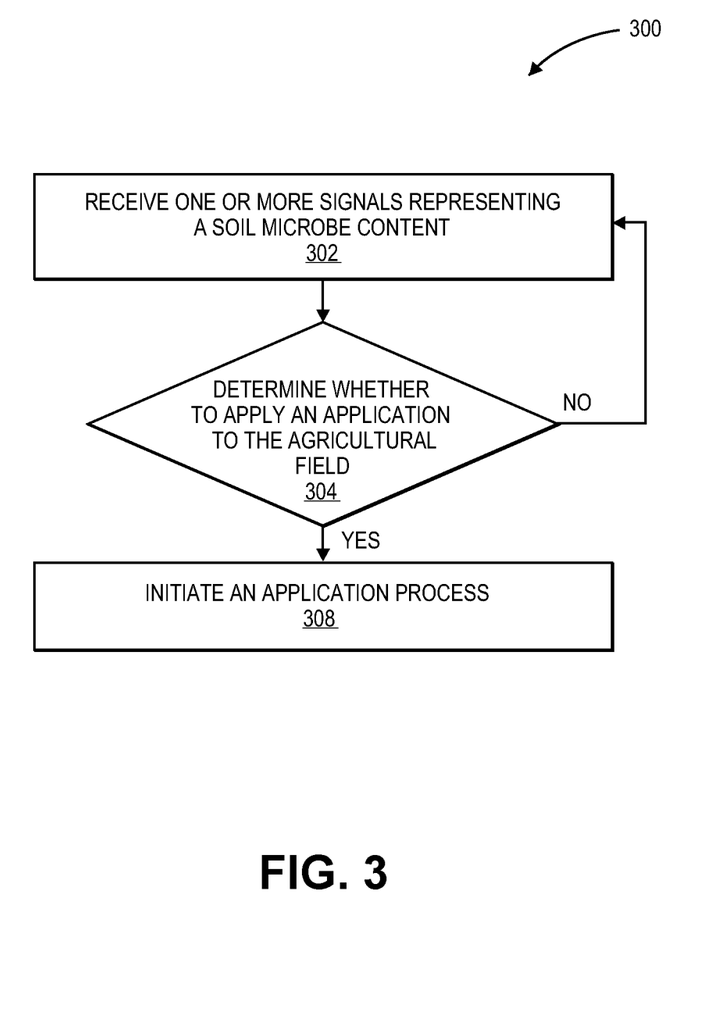
FIG. 3 is a flow diagram illustrating an example method for determining whether to disperse an applicant having a microbe concentration in accordance with an example implementation of the present disclosure.

FIG. 3 illustrates an example method 300 for determining whether to apply or disperse microbes to a field (such as an agricultural field 142) in accordance with an example implementation of the present disclosure. As shown in FIG. 3, one or more signals representing a soil microbe content (e.g., characteristic) or need for soil microbes is received (Block 302). As described above, the sensors 141, 144, 145 (or other data/sensor inputs) may preferably transmit one or more signals to the irrigation system 100 that represent various data including a soil microbe characteristic (e.g., a signal indicating a microbe concentration level). Thereafter, a determination is then preferably made regarding whether an applicant (e.g., water-microbe combination) should be applied to the agricultural field (Decision Block 304) and in what concentrations to provide a target level of microbes.

If application of the applicant is not required (NO from Decision Block 304), the soil microbe characteristic is then preferably scheduled for further monitoring. If application of the applicant is required (YES from Decision Block 304), an application process is initiated (Block 306). The module 137 may then preferably cause actuation of the control valve 202 and/or the control valve 204 of the repository 146 to alter a concentration of the microbes within the irrigation water. The module 137 is also configured to cause the control system 130 to initiate operation of the irrigation assembly (e.g., irrigation system 100). Thus, once the microbe concentration has been altered within the irrigation water, operation of the irrigation assembly may be initiated to disperse the mixture over the field 142.

According to further aspects of the present invention, the module 137 may use environmental and image data to calculate and adjust target microbe levels. According to a preferred embodiment, the module 137 may use weather data (i.e. measurements and/or forecasts of temperature, humidity, sunlight and/or precipitation) to calculate and adjust the microbe concentration levels. For example, if the module 137 determines or senses precipitation, the module 137 may increase the microbe concentration levels in the applicant and reduce watering times. Likewise, if the module 137 detects higher temperatures, lower humidity or less sunlight, the module 137 may decrease microbe concentration levels. This may allow for higher or lower water amounts to be applied without exceeding or falling short of target microbe levels. Further, the module 137 may adjust microbe concentration levels based on stored microbe survivability data for given environmental conditions and the type of microbes applied. For example, the module 137 may preferably adjust microbe concentrations based on the determined microbe performance for a given microbe in a determined or predicted set of environmental conditions. Thus, microbe concentration levels may be reduced at higher temperature and humidity levels; or increased during extreme temperature levels. Further, if microbe survivability is determined to be very low based on sensed conditions, the system may reduce microbe concentrations to zero.

According to further preferred embodiments, the module 137 may adjust microbe concentration levels based on the detected health or growth rate of a given crop. For example, the module 137 may determine poor crop heath or slow growth based on imaging data including imaging data from optical sensors, airborne sensors and/or satellite sensors. Further, microbe concentration levels may be increased based on sensor data indicating strong growth. Such data may include data regarding: crop water use, crop water stress index, plant production ratio and the like. The imaging data may also include vegetation indices such as but not limited to: RVI (ratio vegetation index), NDVI (normalized difference vegetation index), SAVI (soil-adjusted vegetation index), MASVI (modified soil-adjusted vegetation index) and RSR (reduced simple ratio index).

According to further preferred embodiments, where different mixtures of microbes are available for use, the system of the present invention may further alter the ratios/concentration levels of each microbe mixture in addition to controlling the overall, combined microbe concentration levels of the resulting fully-mixed/combined applicant to be disbursed. Preferably, the module 137 may further adjust the ratios/concentration levels of each component of a microbe mixture based on any of the factors discussed above, as well as the price of each mixture/component and the types of microbe used.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims. The scope of the present invention should be determined not by the embodiments illustrated, but by the appended claims and their legal equivalents.

What is claimed is:

1. A system for use with an irrigation system having at least one span, a drive system for moving the span, and an applicant flow system for moving an applicant from a supply source to a dispersal system, wherein the system comprises:
    a plurality of sensors, wherein at least one sensor is configured to detect and transmit soil data for an area of soil; wherein the soil data comprises data selected from the group of data comprising: a moisture level and a microbe level;
    a soil conditioning module, wherein the soil conditioning module is configured to analyze the soil data to determine the volumetric soil moisture and the microbe content for the area of soil;
    a repository connected to the applicant flow system through a first valve; wherein the repository contains a first microbe mixture;

a water source connected to the applicant flow system through a second valve;

a repository sensor, wherein the repository sensor determines a concentration of microbes in the first microbe mixture;

a control system, wherein the control system is configured to control the first valve and the second valve; wherein the control system is configured to open and close the first valve to modify a flow of the first microbe mixture into the applicant flow system; wherein the controller is further configured to open and close the second valve to modify a flow of water into the applicant flow system; wherein the microbe mixture flow and the water flow combine within the applicant flow system to form an applicant mixture;

wherein the soil conditioning module is configured to determine whether a soil microbe characteristic is below a predefined threshold; wherein the soil conditioning module is configured to adjust the microbe concentration within the applicant mixture based on the detected soil microbe characteristic;

wherein the soil conditioning module is configured to adjust the microbe concentration level within the applicant mixture by modifying the relative flows of the microbe mixture through the first valve and the water flow through the second valve.

2. The system of claim 1, wherein the repository sensor comprises a weight sensor; wherein the weight sensor determines a first concentration of microbes in the repository based upon a detected change in weight of the first microbe mixture over time.

3. The system of claim 1, wherein the system further comprises a plurality of environmental sensors; wherein the plurality of environmental sensors are configured to detect one or more environmental conditions selected from the group of environment conditions comprising: humidity, pressure, precipitation, solar radiation, and temperature.

4. The system of claim 1, wherein the system further comprises an image sensor.

5. The system of claim 4, wherein the system further comprises a sensor selected from the group of sensors comprising: a spectrometer, an infrared sensor and an optical sensor.

6. The system of claim 5, wherein the system further comprises a sensor configured to detect crop health.

7. The system of claim 1, wherein the controller is configured to modify the microbe concentration within the repository.

8. The system of claim 1, wherein the controller is configured to change the microbe concentration level of the applicant mixture based on an inputted irrigation schedule.

9. The system of claim 5, wherein the group of sensors comprise at least one sensor configured to monitor crop health using an RGB image.

10. The system of claim 5, wherein the group of sensors comprise at least one sensor configured to monitor crop health using spectrophometric images.

11. The system of claim 3, wherein the soil conditioning module is configured to use environmental data to calculate and adjust target microbe levels.

12. The system of claim 10, wherein the soil conditioning module is configured to use image data to calculate and adjust target microbe levels.

13. The system of claim 11, wherein the soil conditioning module is configured to use environmental data selected from the group of environmental data comprising: temperature, humidity, sunlight and precipitation.

14. The system of claim 13, wherein the soil conditioning module is configured to use a forecast of environmental data to calculate and adjust target microbe levels.

15. The system of claim 13, wherein the soil conditioning module is configured to increase the microbe concentration levels in the applicant mixture based on detected precipitation.

16. The system of claim 13, wherein the soil conditioning module is configured to increase the microbe concentration levels in the applicant mixture based on detected temperatures.

17. The system of claim 16, wherein the soil conditioning module is configured to increase the microbe concentration levels in the applicant mixture based on stored microbe survivability data for a detected environmental condition.

18. The system of claim 14, wherein the soil conditioning module is configured to adjust microbe concentration levels based on a detected crop growth rate.

19. The system of claim 18, wherein the soil conditioning module is configured to increase the microbe concentration levels in the applicant mixture based on a vegetation index; wherein the vegetation index is selected from the group comprising: the RVI (ratio vegetation index), the NDVI (normalized difference vegetation index), the SAVI (soil-adjusted vegetation index), the MASVI (modified soil-adjusted vegetation index) and the RSR (reduced simple ratio index).

20. The system of claim 1, wherein the concentration of microbes in the repository is detected using a sensor selected from the group of sensors comprising: a light sensor and a chemical sensor.

* * * * *